Sept. 11, 1962 R. L. DILLS 3,053,963
HYDRAULIC THERMOSTAT PROTECTOR
Filed Oct. 3, 1960

INVENTOR.
RAYMOND L. DILLS
BY Richard L. Caslin
HIS ATTORNEY

United States Patent Office 3,053,963
Patented Sept. 11, 1962

3,053,963
HYDRAULIC THERMOSTAT PROTECTOR
Raymond L. Dills, Louisville, Ky., assignor to General
Electric Company, a corporation of New York
Filed Oct. 3, 1960, Ser. No. 59,906
6 Claims. (Cl. 219—35)

The present invention relates to range ovens for domestic use and particularly to a means for protecting a hydraulic thermostat in a domestic oven which is designed to operate through two temperature ranges such as a normal cooking range having a maximum temperature below about 600° F. and a higher heat cleaning range having a maximum temperature between 750° and 950° F.

Hydraulic thermostats having an elongated bulb or probe formed on the end of a capillary tube that is joined to a bellows or diaphragm within the thermostat housing have been widely used as oven thermostats for many years. The normal oven cooking temperatures have all been below about 550° F. maximum, and a thermally responsive fluid used in the hydraulic control system has been able to withstand this degree of temperature without difficulty, but the known thermally responsive fluids cannot be operated at temperatures much above this value.

This invention contemplates the provision of a protective arrangement for the thermally responsive fluid so that a thermostat of the hydraulic type may be used successfully as a control element in the high temperature oven described in the co-pending application of Bohdan Hurko, Serial No. 27,926 filed May 9, 1960, which is assigned to the General Electric Company, assignee of the present invention. As there described and claimed the oven is provided with an automatic oven cleaning cycle where the temperature of the oven is raised to a heat cleaning temperature within a range of 750° F. and 950° F. so as to burn off all food soil and leave the inner walls of the oven cavity perfectly clean.

The principal object of the present invention is to provide a forced air protective system for the bulb of a hydraulic thermostat so that the oven temperature may be raised over 950° F. without injurying the bulb or the fluid carried therein.

A further object of the present invention is to provide a cool air blower system for use with a domestic oven so that the thermostatic bulb located within the oven will not operate at a temperature above about 600° F. although the oven temperature might rise to about 950° F.

A still further object of this invention is to provide a forced air cooling system for a domestic oven so as to protect the thermostat bulb from excessive temperatures, and the use of a damper means in the system for automatically closing off the cooling air so the thermostat will not be biased when the oven is to be used for normal cooking.

The present invention is incorporated in an oven which has controlled heating means capable of elevating the oven temperature to an amount materially in excess of 600° F. in accordance with the disclosure of the aforementioned co-pending application of Bohdan Hurko. For controlling the heating means, a hydraulic thermostat is provided having a bulb filled with a thermally responsive liquid and arranged to be placed in a heat sensitive position in the oven. A forced air system is added to the oven and it includes an air duct with an inlet end that is open to room air and an outlet end that is located within the oven cavity that causes the relatively cool air to stream over the bulb and absorb some of the heat of the bulb and successfully restrict the thermostat bulb temperature to a maximum temperature of about 600° F., while the oven temperature will rise to as high as 950° F. during the heat cleaning cycle.

A blower is located in the duct for building up a satisfactory flow of room air into the oven to obtain the desired results. An oven vent is located in the oven liner adjacent the bulb and opposite the orifice so that the flow of cool air into the oven does not adversely affect the oven cleaning process.

My invention will be better understood from the following description taken in connection with the accompanying drawing and its scope will be pointed out in the appended claims.

Figure 1:
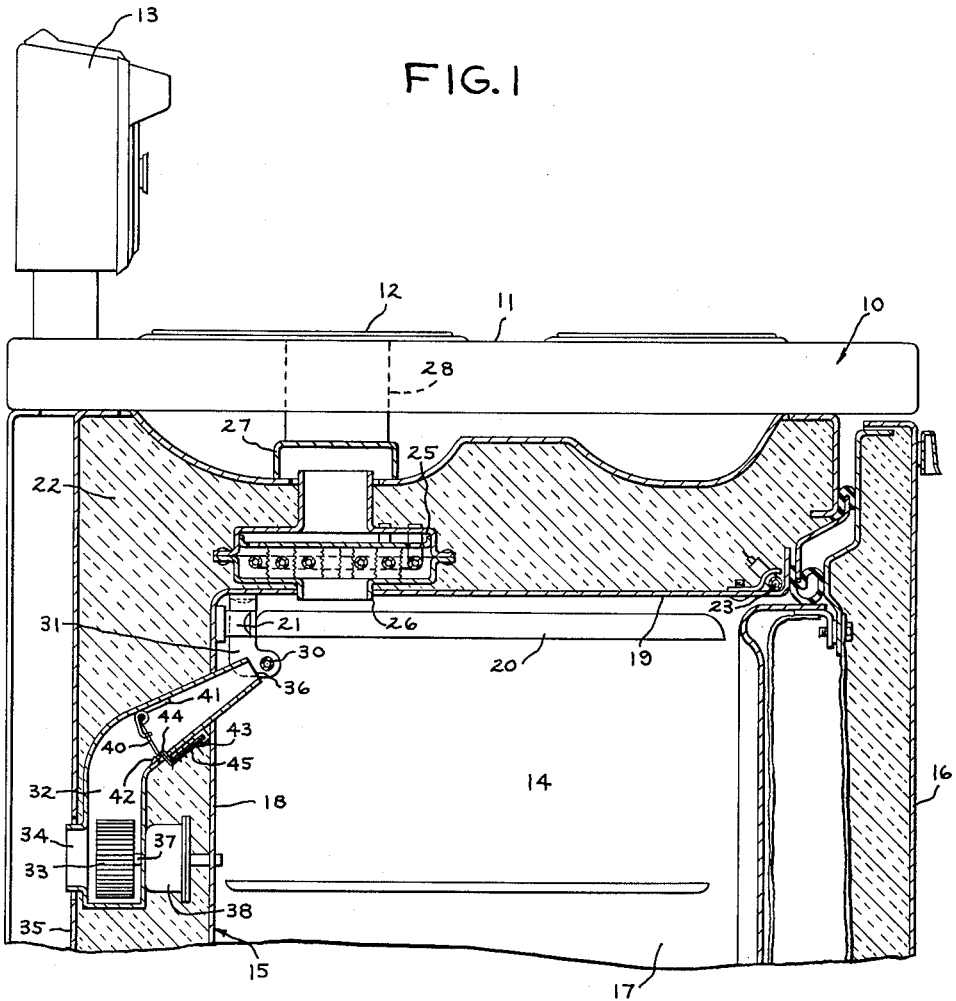
FIGURE 1 is a fragmentary side elevational view partly in cross-section of a free-standing electric range embodying the present invention.

Referring in detail to the drawing and in particular to FIGURE 1, this invention has been shown in one form as applied to a free-standing electric range 10, but it should be understood that this is for illustrative purposes only and that the invention is broad enough to be used in all domestic ovens whether they be heated by gas or electricity. The range 10 includes a top cooking surface 11 having a plurality of surface heating elements 12, a backsplasher 13 containing the manually adjustable control devices for the range, and an oven cavity 14 formed by an oven liner 15 and a front opening drop door 16 which is hinged along its bottom edge as in conventional designs. The present invention is concerned with the design of the oven components so that no further description will be given of the other features of the range which form no part of the present invention.

The oven liner 15 is a box-like construction having a bottom wall (not shown), parallel side walls 17, a back wall 18, and a top wall 19 with an open front that is adapted to be closed by the front door 16. As in standard electric ovens there is a lower heating element or baking unit (not shown) and an upper heating unit or broil unit 20 which is disposed slightly below the top wall 19 of the oven liner. Both the bake and broil units are plug-in units that are inserted into connectors or receptacles such as 21 positioned in suitable openings in the back wall 18 of the oven liner. The oven liner 15 is surrounded by a relatively thick blanket of insulation 22 formed of suitable material such as fiberglass or the like for preventing the escape of heat from the oven cavity as well as to hold down the operating temperature of the outer surface of the oven body 10.

It has been found that the walls of the oven liner may be self-cleaning if the oven temperature is raised to a temperature between about 750° F. and 950° F. for a suitable length of time for burning off the food soil and grease spatter. Also it is known that if there is a temperature drop of a sufficient amount in any particular area of the oven liner the soil will not be completely removed from this area. This was one of the serious problems faced in designing the oven door as is explained in the co-pending Hurko application. Door panels had to be designed, and gasketing methods were devised and a source of additional heat was introduced such as the mullion heater 23 which encircles the periphery of the front portion of the oven liner. The details of the construction of the front portion of the oven will not be discussed here any further as they do not form part of the present invention.

During the heat cleaning cycle smoke is generated from the food soil and grease spatterings that are being burned off the surfaces of the oven liner. This smoke must be eliminated otherwise it might become toxic and cause bodily harm. Accordingly, the gases and water vapor created in the oven cavity are discharged through a vent in the form of a smoke eliminator such as an electric catalytic smoke eliminator 25 of the general type disclosed in the United States Patent to Stanley B. Welch No. 2,900,483, dated August 18, 1959, which is assigned to the same assignee as is the present invention. This smoke eliminator is mounted in a suitable opening 26 in the top wall 19 of the oven liner. An exhaust duct 27 is positioned over the smoke eliminator 25 and extends laterally under the cooking surface with a vertical extension 28 at its end to communicate with the underside of one of the surface heating elements 12 through which it discharges. It will be understood that the vertical extension 28 is offset from the smoke eliminator 25 so as to avoid the spillage of fluids directly into the smoke eliminator.

Figure 2:
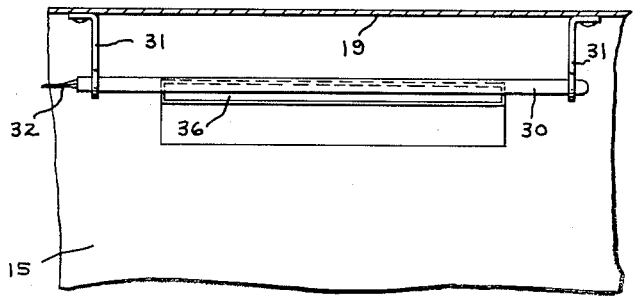
FIGURE 2 is a fragmentary cross-sectional elevational view taken from within the oven cavity looking toward the thermostat bulb and observing the nature of the orifice of the air duct of the forced air cooling system for absorbing some of the heat of the bulb during the heat cleaning cycle as mentioned previously.

As shown in both FIGURES 1 and 2 there is an elongated thermostat bulb 30 that extends along the back wall 18 of the oven liner near the top thereof and it is supported adjacent each end by a small angle bracket 31. The left hand end of the thermostat bulb 30 is joined to a capillary tube 32 for connection to a bellows or diaphragm (not shown) within the oven thermostat so that the temperature changes within the oven may be reflected by the expansion and contraction of the fluid contained within the bulb. A forced air cooling system is mounted on the back of the oven liner and it comprises an air duct 32 and a drum type blower 33. The air duct 32 has an inlet end 34 that is mounted in an opening in a back panel 35 of the oven and is opened to room air. The opposite end or discharge end of the air duct is flattened out to form an elongated orifice 36 which extends along nearly the entire length of the thermostat bulb 30 for supplying the cool air over the bulb so as to absorb some of the heat of the bulb during the heat cleaning cycle.

The blower unit 33 is shown as supported on the shaft 37 of a rotisserie motor 38 so that the rotisserie motor is capable of two functions; namely, of driving a rotisserie spit (not shown) and, secondly, of rotating the blower 33. The inlet end 34 of the air duct 32 is only slightly larger than the blower 33 but the orifice 36 has been enlarged and flattened so that it is much wider than the blower unit. While I have not shown guide vanes in the orifice it is well understood in this art that guide vanes might be desirable within the mouth of the orifice for distributing the flow of air so that it will be more or less uniform over the complete width of the orifice rather than having a higher air pressure concentrated near the center of the orifice.

The rotisserie motor would either be energized by a rotisserie control switch (not shown) or secondly, whenever the oven thermostat is set to the heat cleaning cycle. For instance, if the housewife wished to clean her oven she would simply latch the door by means not shown and set the thermostatic controls to a heat cleaning position. This would immediately energize the rotisserie motor and the blower 33 would begin to pull room air into the air duct 32 for discharging over the extent of the thermostat bulb 30. After passing over the bulb, the air would enter the smoke eliminator 25 and leave the oven through the exhaust duct 27, 28. It has been found that this invention has been successful in holding the thermostat bulb temperature down around 600° F. with an air flow of about 1.3 c.f.m.; while, at the same time, not adversely affecting the cleaning cycle because of the close cooperation of the smoke eliminator 25 and the orifice 36. It is important not to starve the smoke eliminator of oxygen. In ovens lacking a forced air system the lack of sufficient oxygen has cut down the efficiency of the smoke eliminator. The blower of this invention prevents such an occurrence. Also, the air movement created by the blower improves the oven heat distribution and thereby improves the combustion of the food soil in cold spots.

It will be understood that after the heat cleaning cycle is completed and the housewife is engaged in normal cooking she might wish to use the rotisserie. Since the blower unit 33 is fixed to the rotisserie shaft the blower will be operating whenever the rotisserie motor is energized. This is objectionable because cool air will be blowing over the thermostat bulb 30 during normal cooking so that the thermostat would not be detecting the actual oven temperature but instead the much lower temperature of the thermostat bulb. My solution is the use of a spring biased damper means 40 positioned in the air duct downstream of the blower unit 33. When the blower 33 is not running the damper 40 is normally closed by a weak torsion spring 41 that is combined with the hinge action of the damper. Notice the small fixed stop 42 in the duct which holds the damper in the proper closed position. Whenever the blower 33 is operated the force of the air stream is enough to overcome the spring force and open the damper. Hence, there must be a latching means for locking the damper closed except when the oven is to operate in its heat cleaning cycle. Such a latching means is provided by an ambient compensated heated bimetal 43 which has a small tongue portion 44 formed at a right angle thereto and extending through a small opening in the duct for engagement behind the damper when the damper is in its closed position. Thus, the damper is locked when it is sandwiched between the tongue 44 of the bimetal and the fixed stop 42. The bimetal is heated by a small resistance heater 45 that is adjacent thereto and is energized whenever the heating elements of the oven are energized during a heat cleaning cycle. Accordingly, when the thermostat is set to the heat cleaning position the rotisserie motor 38 will be operated and the heater 45 of the bimetal latch 43 will be energized to bias the bimetal away from the duct so that the tongue 44 will disengage the damper 40. This permits the air pressure built up by the blower 33 to open the damper and cool the thermostat bulb.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A high temperature oven having radiant heating means, a hydraulic thermostatic control system for controlling the heating means of the oven, said control system comprising a thermostat bulb fixedly mounted within the oven for direct exposure to the rays of the heating means, a temperature responsive fluid filling said thermostat bulb for controlling said heating means responsively to the expansion and contraction of the fluid, and protective means for preventing an excessive temperature rise in said fluid, said protective means including a blower for forcing room air into the oven and directing it over the exposed thermostat bulb to absorb enough heat from the bulb to hold its temperature below a maximum of about 600° F. while the actual oven air temperature rises appreciably above 600° F. to between 750° F. and 950° F., and a discharge opening adjacent the bulb for discharging from the oven the cool air from the blower after it passes over the bulb.

2. A high temperature oven as recited in claim 1 wherein the blower is positioned in an air duct that has an inlet end that is open to room air and a discharge end within the oven adjacent the thermostat bulb, there being a damper means in the duct downstream of the blower for closing the duct and preventing the flow of cooling air into the oven and onto the bulb during a normal cooking operation, and temperature controlled means for effecting the opening of said damper means for the free flow of cooling air over the bulb when the oven temperature is to rise above about 600° F.

3. A high temperature oven as recited in claim 2 wherein the damper means has a spring means for normally biasing the damper means to a closed position, the air pressure created by the blower being capable of overcoming the spring means and opening the damper means, and temperature responsive latch means for locking the damper means closed during normal cooking temperatures and for unlocking the damper means when the oven temperature is to rise above about 600° F.

4. A high temperature oven having electric radiant heating element, a thermostatic control system for controlling the heating elements, said control system comprising a bulb supported in the back of the oven for direct exposure to the rays of the heating elements, a temperature responsive fluid filling said bulb for controlling said heating element responsively to the expansion and contraction of the fluid, and protective means for preventing excessive temperature rise of the exposed bulb, said protective means comprising an air duct having an inlet end that is open to room air and an elongated orifice at its outlet end that is closely adjacent to the bulb and extends along nearly the entire length thereof, a blower disposed within the duct for discharging relatively cool room air over the bulb, and means controlling the discharge effect of said blower whenever the oven temperature rises above the normal maximum cooking temperature of 600° F. so that cooling air flows over said bulb to absorb heat therefrom thereby to restrict its maximum temperature to about 600° F., while the oven air temperature rises to an amount between 750° F. and 950° F., and a discharge duct adjacent the bulb for exhausting the relatively cool air brought into the oven by the blower.

5. A high temperature oven having electric radiant heating elements, a thermostatic control system for controlling the heating elements in two temperature ranges such as a normal cooking temperature range with a maximum temperature of about 600° F. and a higher heat cleaning temperature range between about 750° F. and 950° F., a thermostatic bulb positioned within the oven liner for direct exposure to the rays of the heating elements, the bulb containing a temperature responsive fluid for controlling said heating element responsively to the expansion and contraction of the fluid, and protective means for preventing an excessive temperature rise in the exposed bulb when the oven temperature is in the heat cleaning temperature range, said protective means comprising an air duct with an elongated orifice for discharging cool air uniformly over the bulb for nearly its entire length so as to absorb some of the heat in the bulb and restrict its maximum temperature to about 600° F., and a discharge means adjacent the bulb for exhausting the relatively cool air brought into the oven by the blower.

6. A high temperature oven as specified in claim 1 wherein a smoke eliminator is located in said discharge opening.

References Cited in the file of this patent
UNITED STATES PATENTS

| | | |
|---|---|---|
| 2,224,945 | Ames | Dec. 17, 1940 |
| 2,247,626 | Ames | July 1, 1941 |
| 2,463,712 | Newell | Mar. 8, 1949 |
| 2,900,483 | Welch | Aug. 18, 1959 |
| 2,922,018 | Walkoe | Jan. 19, 1960 |

FOREIGN PATENTS

| | | |
|---|---|---|
| 732,120 | Great Britain | June 22, 1955 |